United States Patent
Piech et al.

(10) Patent No.: US 9,932,204 B2
(45) Date of Patent: Apr. 3, 2018

(54) DRIVE UNIT FOR MULTIPHASE PERMANENT MAGNET SYNCHRONOUS MOTOR

(71) Applicant: Otis Elevator Company, Farmington, CT (US)

(72) Inventors: Zbigniew Piech, Cheshire, CT (US); Cezary Jedryczka, Lniano (PL); Wojciech Szelag, Poznan (PL)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/111,028

(22) PCT Filed: Jan. 13, 2014

(86) PCT No.: PCT/US2014/011264
§ 371 (c)(1),
(2) Date: Jul. 12, 2016

(87) PCT Pub. No.: WO2015/105510
PCT Pub. Date: Jul. 16, 2015

(65) Prior Publication Data
US 2016/0340151 A1      Nov. 24, 2016

(51) Int. Cl.
*H02K 3/28*       (2006.01)
*B66B 11/04*      (2006.01)
(Continued)

(52) U.S. Cl.
CPC .......... *B66B 11/0407* (2013.01); *B66B 1/28* (2013.01); *H02K 3/28* (2013.01); *H02K 11/33* (2016.01);
(Continued)

(58) Field of Classification Search
CPC ........................................................ H02K 3/28
(Continued)

(56) References Cited

U.S. PATENT DOCUMENTS 6,956,341 B2   10/2005   Nakai et al.
7,372,712 B2   5/2008    Stancu et al.
(Continued)

FOREIGN PATENT DOCUMENTS

DE   102010003217 A1   9/2011
JP   H07298685 A       11/1995
(Continued)

OTHER PUBLICATIONS

International Search Report and Written Opinion for application PCT/US2014/011264 dated Oct. 10, 2014, 9 pages.
(Continued)

*Primary Examiner* — David S Luo
(74) *Attorney, Agent, or Firm* — Cantor Colburn LLP (57) ABSTRACT

A conveyance system includes a car; a machine for imparting motion to the car, the machine including a stator and a rotor, the stator including 12*k stator teeth, the rotor including 11*k rotor poles, wherein k is a natural even number, the machine including windings located at the stator teeth, the windings arranged in 6 phases; and a drive unit for providing drive signals to the machine, the drive unit including a plurality of drives, the number of drives being an integer multiple of 2.

20 Claims, 14 Drawing Sheets

(51) Int. Cl.
  *B66B 1/28* (2006.01)
  *H02P 25/22* (2006.01)
  *H02K 21/16* (2006.01)
  *H02K 11/33* (2016.01)
  *H02K 21/02* (2006.01)
  *H02K 16/04* (2006.01)

(52) U.S. Cl.
  CPC ............. *H02K 21/02* (2013.01); *H02K 21/16* (2013.01); *H02P 25/22* (2013.01); *H02K 16/04* (2013.01); *H02K 2213/03* (2013.01); *H02K 2213/12* (2013.01)

(58) Field of Classification Search
  USPC .................................................. 318/34, 700
  See application file for complete search history.

(56) References Cited

U.S. PATENT DOCUMENTS

| | | | | |
|---|---|---|---|---|
| 7,605,514 B2* | 10/2009 | Ito | ............................ | H02K 3/28 310/179 |
| 7,990,098 B2 | 8/2011 | Perisic et al. | | |
| 8,146,714 B2* | 4/2012 | Blasko | ...................... | B66B 1/30 187/290 |
| 8,536,754 B2* | 9/2013 | Dajaku | .................. | H02K 1/165 310/180 |
| 8,590,672 B2* | 11/2013 | Oggianu | .................. | B66B 1/302 187/290 |
| 2010/0201219 A1 | 8/2010 | Moellgaard et al. | | |
| 2012/0001512 A1 | 1/2012 | Dajaku | | |
| 2012/0043155 A1 | 2/2012 | Feuerrohr | | |
| 2012/0187893 A1 | 7/2012 | Baba et al. | | |

FOREIGN PATENT DOCUMENTS

| | | |
|---|---|---|
| JP | 2000201462 A | 7/2000 |
| JP | 2005110414 A | 4/2005 |
| JP | 2009050036 A | 3/2009 |
| JP | 2010178442 A | 8/2010 |
| KR | 20120041318 A | 5/2012 |
| WO | 2010110483 A2 | 9/2010 |

OTHER PUBLICATIONS

European Search Report for application EP 14877715.4, dated Sep. 1, 2017, 10pgs.

* cited by examiner

DRIVE UNIT FOR MULTIPHASE PERMANENT MAGNET SYNCHRONOUS MOTOR

FIELD OF INVENTION

The subject matter disclosed herein relates generally to drive units, and more particularly to a drive unit for use with a multiphase permanent magnet synchronous motor for use in a conveyance system.

BACKGROUND

Conveyance systems, such as elevator systems, use machines to impart force to a car carrying passengers. The machines employed may need to provide varying power levels depending on the application. For example, an elevator for hoisting larger loads requires a higher power machine. The machines are driven by a drive unit having electrical power requirements meeting the machine load requirements. Typically, when a machine is required to handle higher loads, a high power drive unit needs to be developed or sourced, and tested for proper operation (e.g., certified). The process of selecting a specific drive unit for each machine load is time consuming and costly.

BRIEF SUMMARY

According to an exemplary embodiment, a conveyance system includes a car; a machine for imparting motion to the car, the machine including a stator and a rotor, the stator including 12*k stator teeth, the rotor including 11*k rotor poles, wherein k is a natural even number, the machine including windings located at the stator teeth, the windings arranged in 6 phases; and a drive unit for providing drive signals to the machine, the drive unit including a plurality of drives, the number of drives being an integer multiple of 2.

Alternatively or additionally in this or other embodiments, the windings associated with each phase and coupled to a common drive are arranged in electrical series.

Alternatively or additionally in this or other embodiments, the windings associated with each phase and coupled to a common drive are arranged in electrically parallel branches, each branch include windings arranged in electrical series.

Alternatively or additionally in this or other embodiments, the windings associated with each phase and coupled to a common drive are arranged in electrical parallel.

Alternatively or additionally in this or other embodiments, the number of drives equals 2.

Alternatively or additionally in this or other embodiments, the number of drives equals 4.

Alternatively or additionally in this or other embodiments, the drives include a first drive and a second drive, the first drive generating drive signals of a first phase, second phase and third phase, the second drive generating drive signals of a fourth phase, fifth phase and sixth phase.

Alternatively or additionally in this or other embodiments, the first phase and fourth phase are offset by an angle of 30 degrees.

Alternatively or additionally in this or other embodiments, the car is an elevator car.

According to an exemplary embodiment, a conveyance system includes a car; a machine for imparting motion to the car, the machine including a stator and a rotor, the stator including 18*k stator teeth, the rotor including 17*k rotor poles, wherein k is a natural even number, the machine including windings located at the stator teeth, the windings arranged in 9 phases; and a drive unit for providing drive signals to the machine, the drive unit including a plurality of drives, the number of drives being an integer multiple of 3.

Alternatively or additionally in this or other embodiments, the windings associated with each phase and coupled to a common drive are arranged in electrical series.

Alternatively or additionally in this or other embodiments, the windings associated with each phase and coupled to a common drive are arranged in electrically parallel branches, each branch include windings arranged in electrical series.

Alternatively or additionally in this or other embodiments, the windings associated with each phase and coupled to a common drive are arranged in electrical parallel.

Alternatively or additionally in this or other embodiments, the number of drives equals 3.

Alternatively or additionally in this or other embodiments, the number of drives equals 6.

Alternatively or additionally in this or other embodiments, the drives include a first drive and a second drive, the first drive generating drive signals of a first phase, second phase and third phase, the second drive generating drive signals of a fourth phase, fifth phase and sixth phase.

Alternatively or additionally in this or other embodiments, the first phase and fourth phase are offset by an angle of 40 degrees.

Alternatively or additionally in this or other embodiments, the drives include a third drive, the third drive generating drive signals of a seventh phase, eighth phase and ninth phase.

Alternatively or additionally in this or other embodiments, the first phase and seventh phase are offset by an angle of 80 degrees.

Alternatively or additionally in this or other embodiments, the car is an elevator car.

Other aspects, features, and techniques of embodiments of the invention will become more apparent from the following description taken in conjunction with the drawings.

BRIEF DESCRIPTION OF THE DRAWINGS

Referring now to the drawings wherein like elements are numbered alike in the FIGURES.

DETAILED DESCRIPTION

Figure 1:
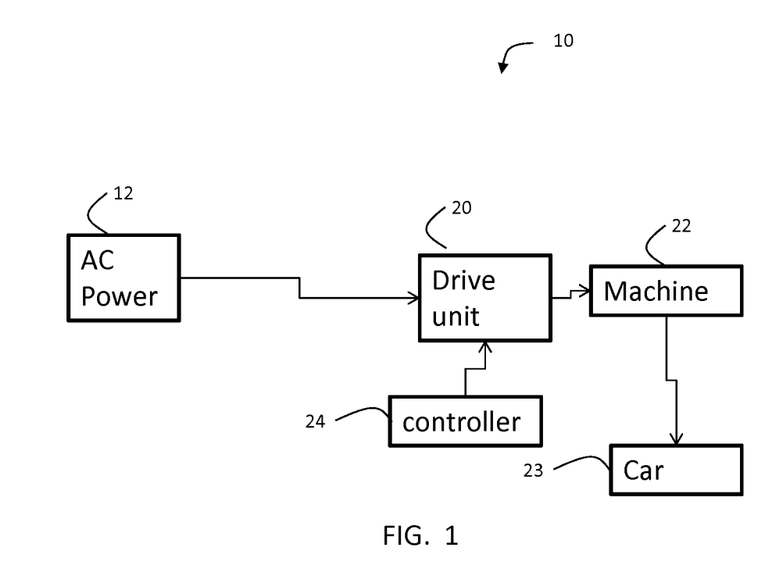
FIG. 1 is a block diagram of components of an elevator system in an exemplary embodiment.

FIG. 1 is a block diagram of components of an elevator system 10 in an exemplary embodiment. Although embodiments are described with respect to an elevator system, it is understood that embodiments may be applied to other conveyance systems (e.g., trains, automobiles, marine). Elevator system 10 includes a source of AC power 12, such as an electrical main line (e.g., 440 volt, 3-phase). The AC power 12 is provided to a drive unit 20. Drive unit 20 includes a plurality of drives, with each drive generating drive signals arranged in three phrases. Each drive may include a rectifier to convert the AC power 12 to a DC voltage. Each drive may include an inverter to convert the DC voltage to multiphase, AC drive signals. Drive signals from the drive unit 20 are supplied to a multiphase machine 22 to impart motion to elevator car 23. In an exemplary embodiment, machine 22 is a multiphase, permanent magnet synchronous motor. Various configurations of motor phases and drives are described in further detail herein.

A controller 24 provides control signals to the drives of drive unit 20 to control generation of the drive signals. Controller 24 may be implemented using a general-purpose microprocessor executing a computer program stored on a storage medium to perform the operations described herein. Alternatively, controller 24 may be implemented in hardware (e.g., ASIC, FPGA) or in a combination of hardware/software. Controller 24 may also be part of an elevator control system.

Figure 2:
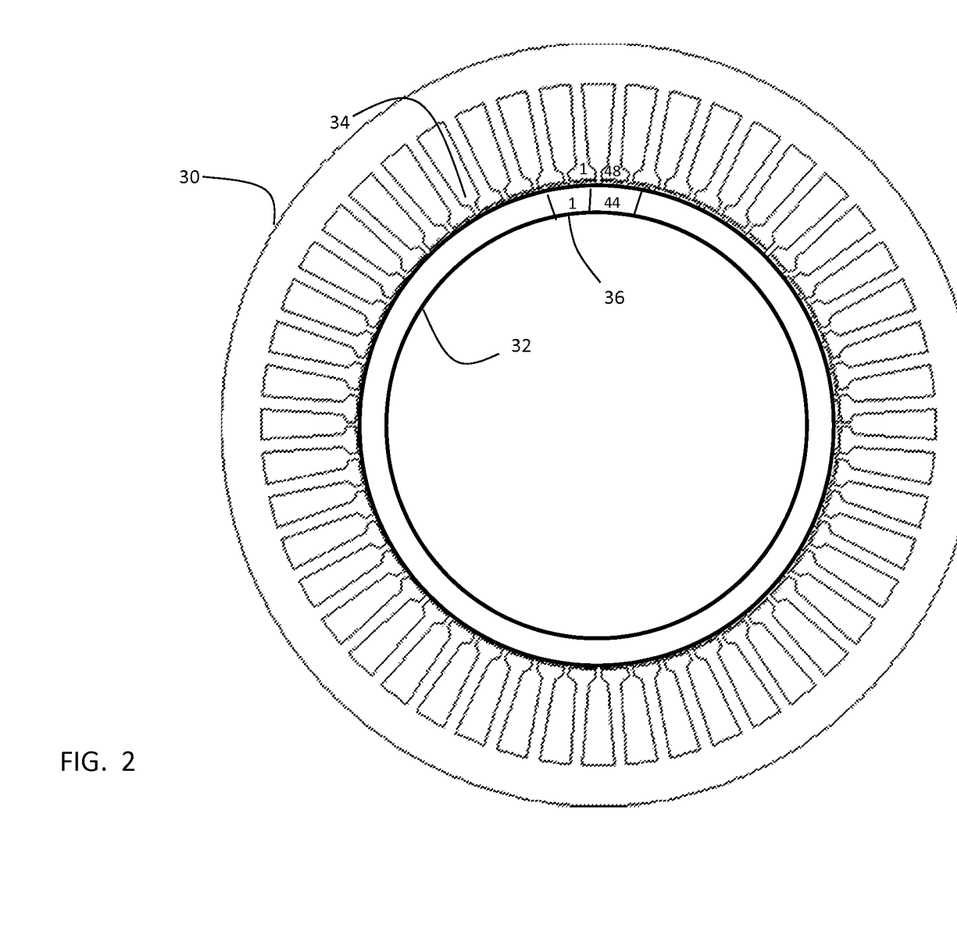
FIG. 2 depicts a stator and rotor in an exemplary embodiment.

FIG. 2 depicts a stator 30 and rotor 32 of machine 22 in an exemplary embodiment. Stator 30 includes a plurality of stator teeth 34, upon each of which a phase winding is wound as described herein. Rotor 32 includes a plurality of permanent magnets 36, defining rotor poles. In the embodiment of FIG. 2, stator 30 has 48 stator teeth and rotor 32 has 44 rotor poles. Embodiments of a 6 phase machine 22 include machines having 12*k stator teeth and 11*k rotor poles (where k is natural even number, e.g., 2, 4, 6, . . .).

Figure 3:
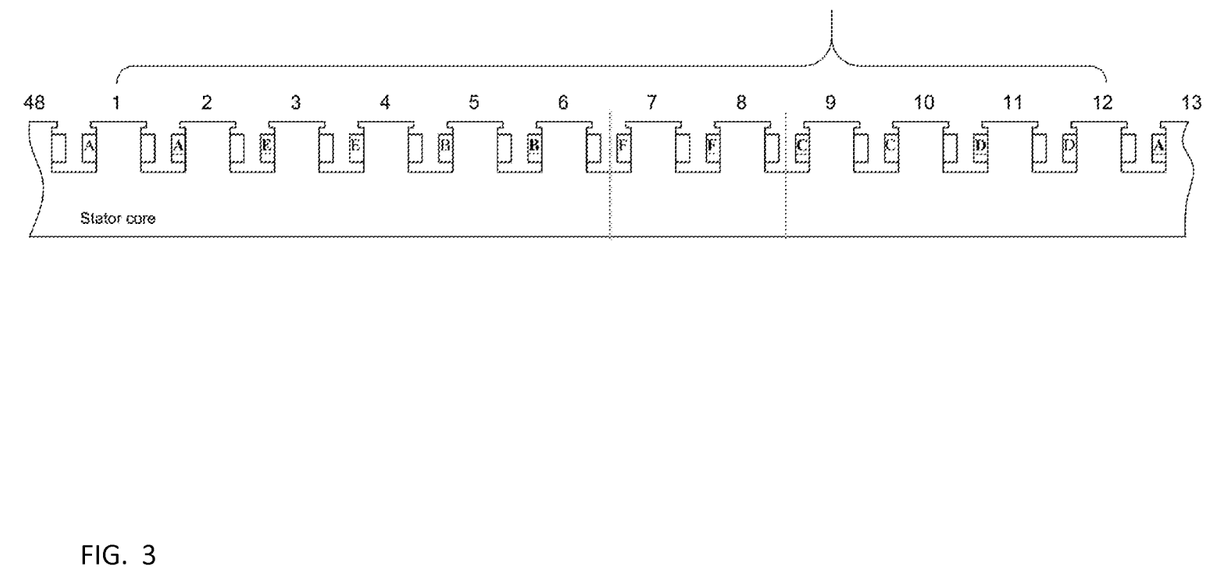
FIG. 3 depicts stator teeth in an exemplary embodiment.

FIG. 3 depicts a 12-tooth section of a stator having 48 stator teeth. In the embodiment of FIG. 3, machine 22 is a 6 phase, permanent magnet synchronous motor. The six phases in FIG. 3 are represented by letters, where ABCDEF correspond to positive windings for each phase and $\overline{ABCDEF}$ correspond to negative windings for each phase. The pattern of windings in FIG. 3 is A$\underline{A}$ E$\underline{E}$ B$\underline{B}$ F$\underline{F}$ C$\underline{C}$ D$\underline{D}$, where letters A-F correspond to six phases. The pattern of windings in the next 12 stator teeth is electrically reversed, i.e., $\underline{A}$A $\underline{E}$E $\underline{B}$B $\underline{F}$F $\underline{C}$C $\underline{D}$D.

Figure 4:
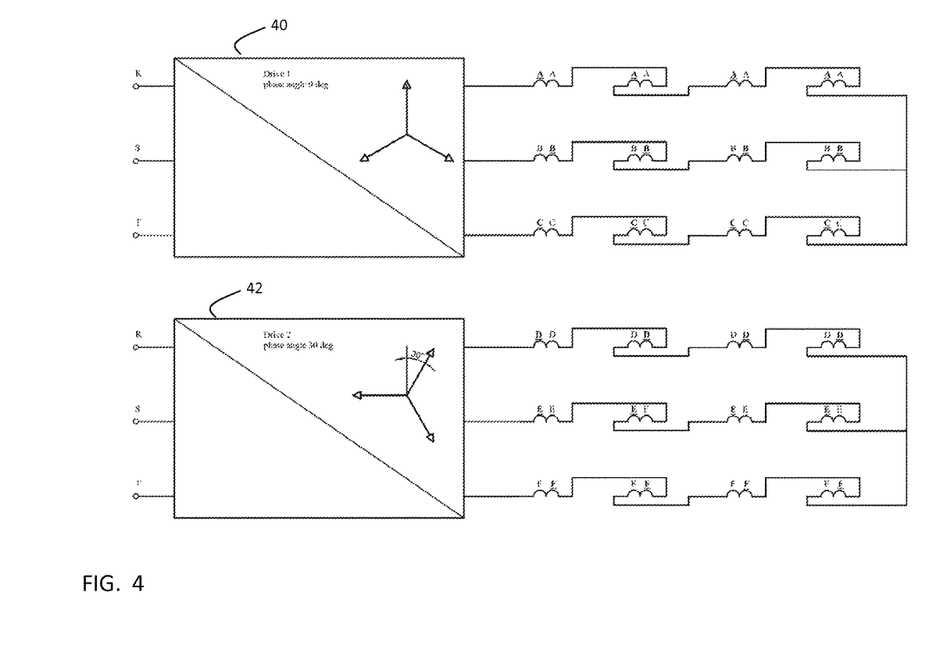
FIGS. 4-6 depict windings of a 6 phase permanent magnet synchronous motor coupled to 2 drives in exemplary embodiments.

FIG. 4 depicts an exemplary embodiment of a 48 tooth permanent magnetic synchronous motor supplied from a real 6 phase supply system composed of 2 galvanic separated 3 phase drives. In the embodiment of FIG. 4, all windings for a single phase are connected in series. A first drive 40, of drive unit 20, generates three phase drive signals, ABC, with each phase separated by 120 degrees. The windings are arranged such that all the windings associated with phase A are in series, all the windings associated with phase B are in series and all the windings associated with phase C are in series. The windings arranged in series alternate polarity. A second drive 42, of drive unit 20, generates three phase drive signals, DEF, with each phase separated by 120 degrees. Phases DEF are offset from phases ABC, respectively, by an angle (e.g., 30 degrees). The windings are arranged such that all the windings associated with phase D are in series, all the windings associated with phase E are in series and all the windings associated with phase F are in series. The windings arranged in series alternate polarity.

Figure 5:
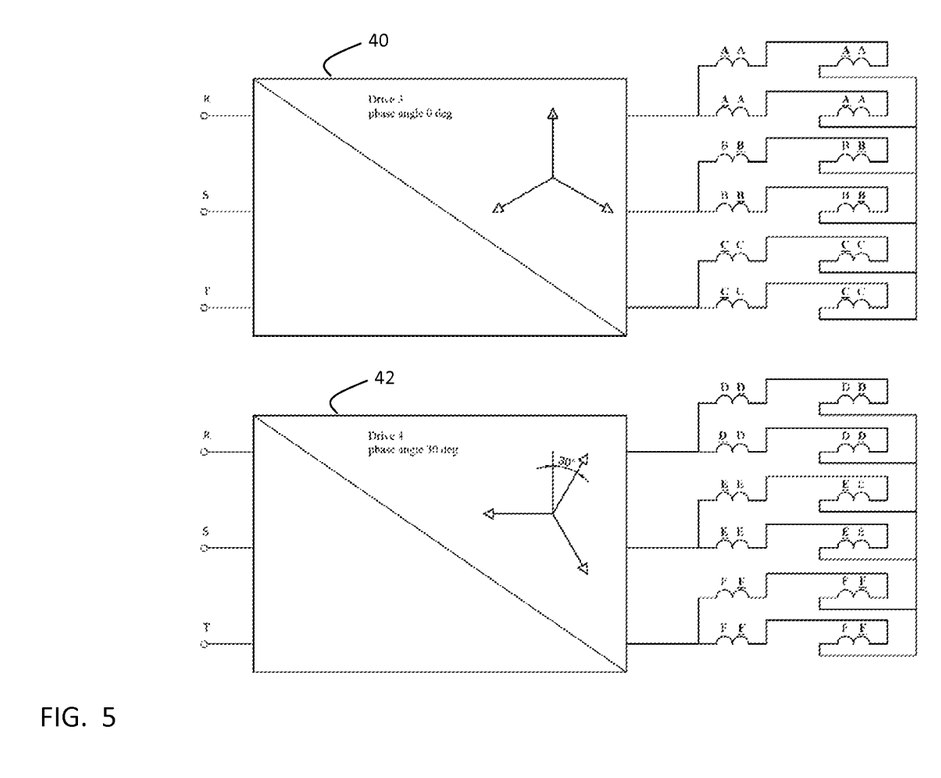

FIG. 5 depicts an exemplary embodiment of a 48 tooth permanent magnetic synchronous motor supplied from a real 6 phase supply system composed of 2 galvanic separated 3 phase drives. Drives 40 and 42 are similar to those in FIG. 4. In the embodiment of FIG. 5, windings for a respective phase are connected in two parallel branches, each branch having series connected windings. The windings arranged in series alternate polarity.

Figure 6:
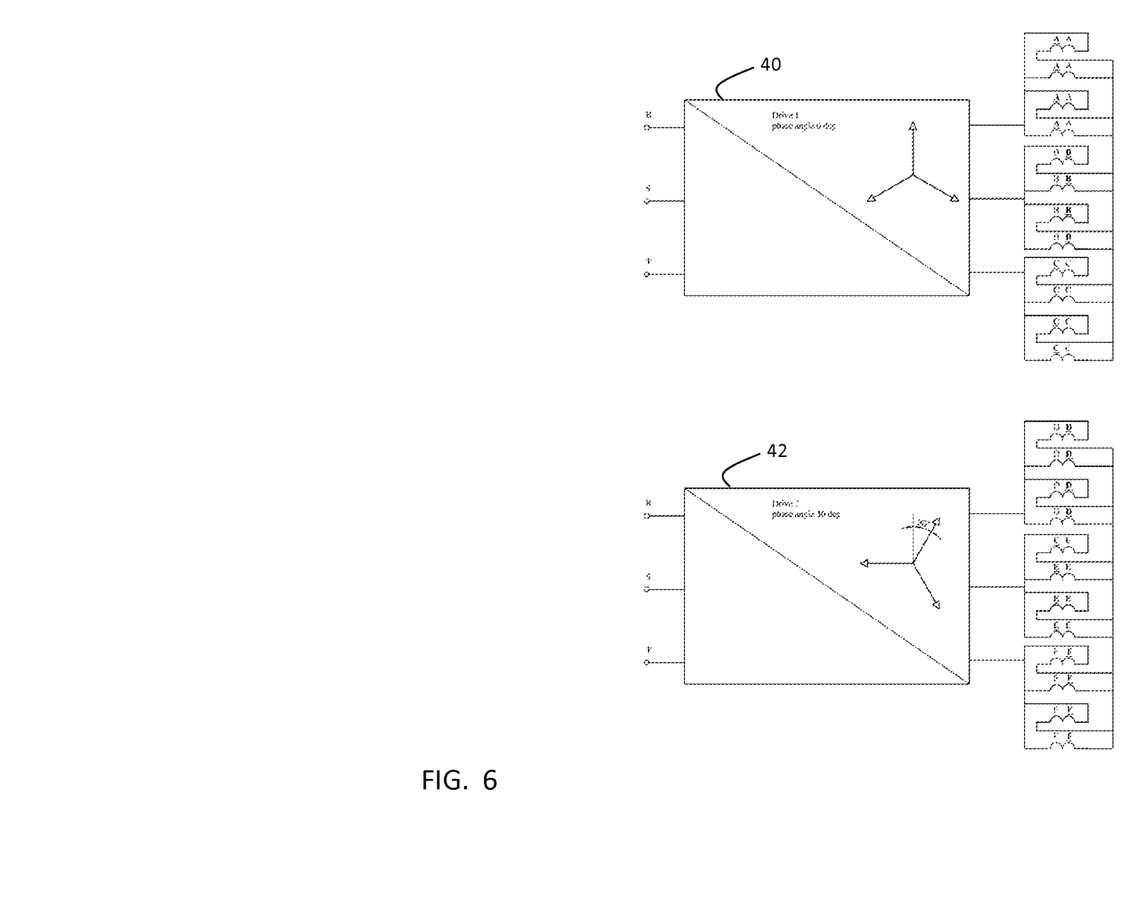

FIG. 6 depicts an exemplary embodiment of a 48 tooth permanent magnetic synchronous motor supplied from a real 6 phase supply system composed of 2 galvanic separated 3 phase drives. Drives 40 and 42 are similar to those in FIG. 4. In the embodiment of FIG. 6, windings for a respective phase are connected in four parallel branches, each branch having a single positive-negative winding pair.

Figure 7:
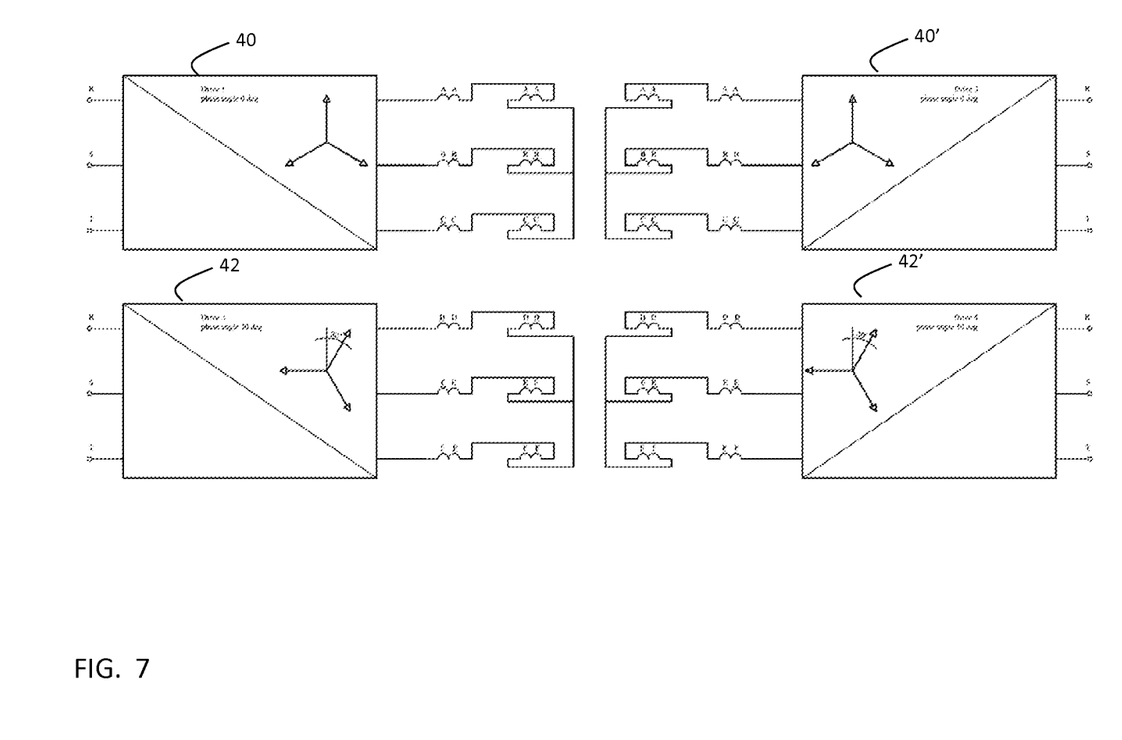
FIGS. 7-8 depict windings of a 6 phase permanent magnet synchronous motor coupled to 4 drives in exemplary embodiments.

FIG. 7 depicts an exemplary embodiment of a 48 tooth permanent magnetic synchronous motor supplied from a real 6 phase supply system composed of 4 galvanic separated 3 phase drives. In the embodiment of FIG. 7, two drives 40 and 40' are used to generate drive signals for phases ABC. Two drives 42 and 42' are used to generate drive signals for phases DEF. Windings of the same phase coupled to a common drive are connected in series. Using two drives 40 and 40' for phases ABC and two drives 42 and 42' for phases DEF provides increased power over the embodiments of FIGS. 4-6, to handle higher loads.

Figure 8:
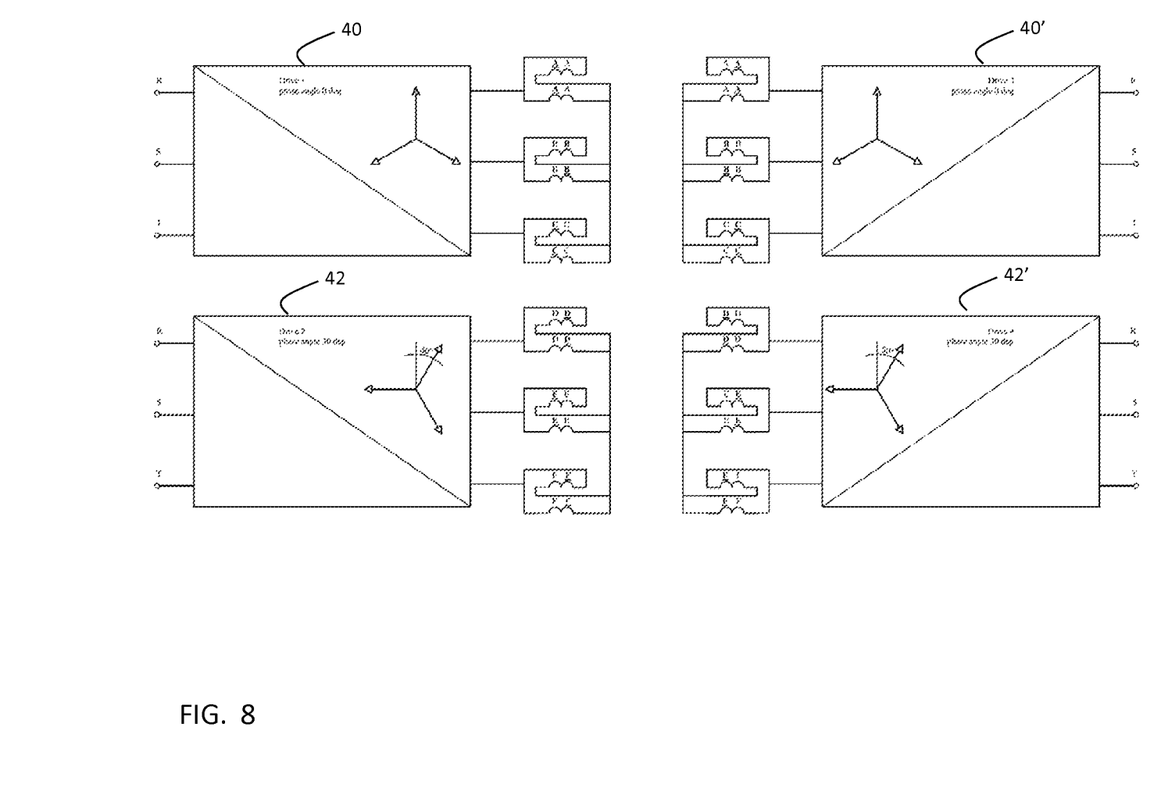

FIG. 8 depicts an exemplary embodiment of a 48 tooth permanent magnetic synchronous motor supplied from a real 6 phase supply system composed of 4 galvanic separated 3 phase drives. In the embodiment of FIG. 8, two drives 40 and 40' are used to generate drive signals for phases ABC. Two drives 42 and 42' are used to generate drive signals for phases DEF. Windings of the same phase coupled to a common drive are connected in parallel.

The above embodiments of FIGS. 4-8 relate to a 6 phase permanent magnetic synchronous motor coupled to a number of drives. The number of drives in FIGS. 4-8 is 2 or 4, but in other embodiments the number of drives may be an integer multiple of 2.

Figure 9:
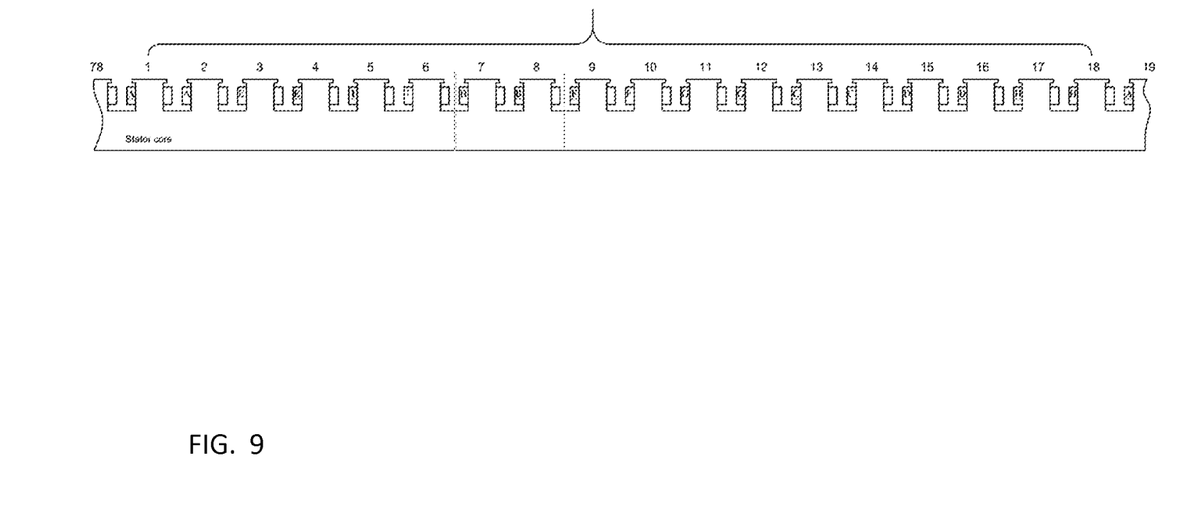
FIG. 9 depicts stator teeth in an exemplary embodiment.

Other embodiments employ a 9 phase permanent magnetic synchronous motor. Embodiments of a 9 phase machine 22 include machines having 18*k stator teeth and 17*k rotor poles (where k is natural even number, e.g., 2, 4, 6, . . .). In one exemplary embodiment, the stator includes 72 stator teeth and the rotor includes 68 poles. FIG. 9 depicts an 18-tooth section of a stator having 72 stator teeth. In the embodiment of FIG. 9, machine 22 is a 9 phase, permanent magnet synchronous motor. The 9 phases in FIG. 9 are represented by letters, where ABCDEFGHI correspond to positive windings for each phase and $\overline{ABCDEFGHI}$ correspond to negative windings for each phase. The pattern of windings in FIG. 9 is A$\underline{A}$ E$\underline{E}$ I$\underline{I}$ B$\underline{B}$ F$\underline{F}$ G$\underline{G}$ C$\underline{C}$ D$\underline{D}$ H$\underline{H}$, where letters A-I correspond to 9 phases. The pattern of windings in the next 18 stator teeth is electrically reversed, i.e., $\underline{A}$A $\underline{E}$E $\underline{I}$I $\underline{B}$B $\underline{F}$F $\underline{G}$G $\underline{C}$C $\underline{D}$D $\underline{H}$H.

Figure 10:
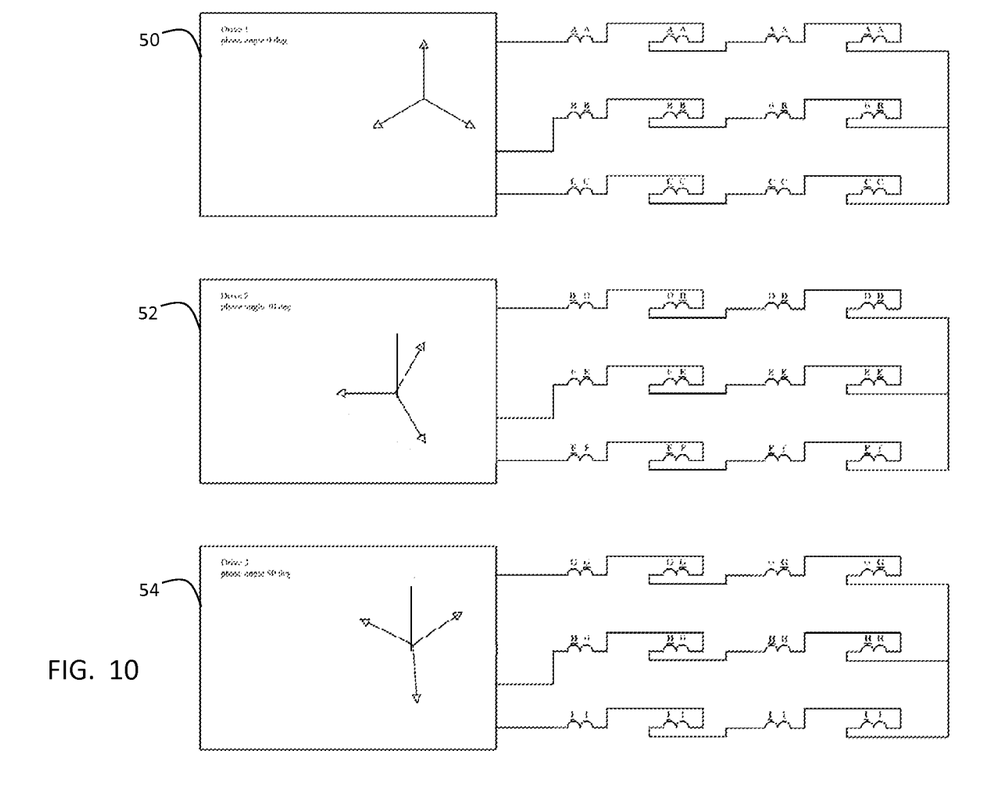
FIGS. 10-12 depict windings of a 9 phase permanent magnet synchronous motor coupled to 3 drives in exemplary embodiments.

FIG. 10 depicts an exemplary embodiment of a 72 tooth permanent magnetic synchronous motor supplied from a real 9 phase supply system composed of 3 galvanic separated 3 phase drives. In the embodiment of FIG. 10, all windings for a phase are connected in series. A first drive 50, of drive unit 20, generates three phase drive signals, ABC, with each phase separated by 120 degrees. The windings are arranged such that all the windings associated with phase A are in series, all the windings associated with phase B are in series and all the windings associated with phase C are in series. The windings arranged in series alternate polarity. A second drive 52, of drive unit 20, generates three phase drive signals, DEF, with each phase separated by 120 degrees. Phases DEF are offset from phases ABC, respectively, by an angle (e.g., 40 degrees). The windings are arranged all the windings associated with phase D are in series, all the windings associated with phase E are in series and all the windings associated with phase F are in series. The windings arranged in series alternate polarity. A third drive 54, of drive unit 20, generates three phase drive signals, GHI, with each phase separated by 120 degrees. Phases GHI are offset from phases ABC, respectively, by an angle (e.g., 80 degrees). The windings are arranged all the windings associated with phase G are in series, all the windings associated with phase H are in series and all the windings associated with phase I are in series. The windings arranged in series alternate polarity.

Figure 11:
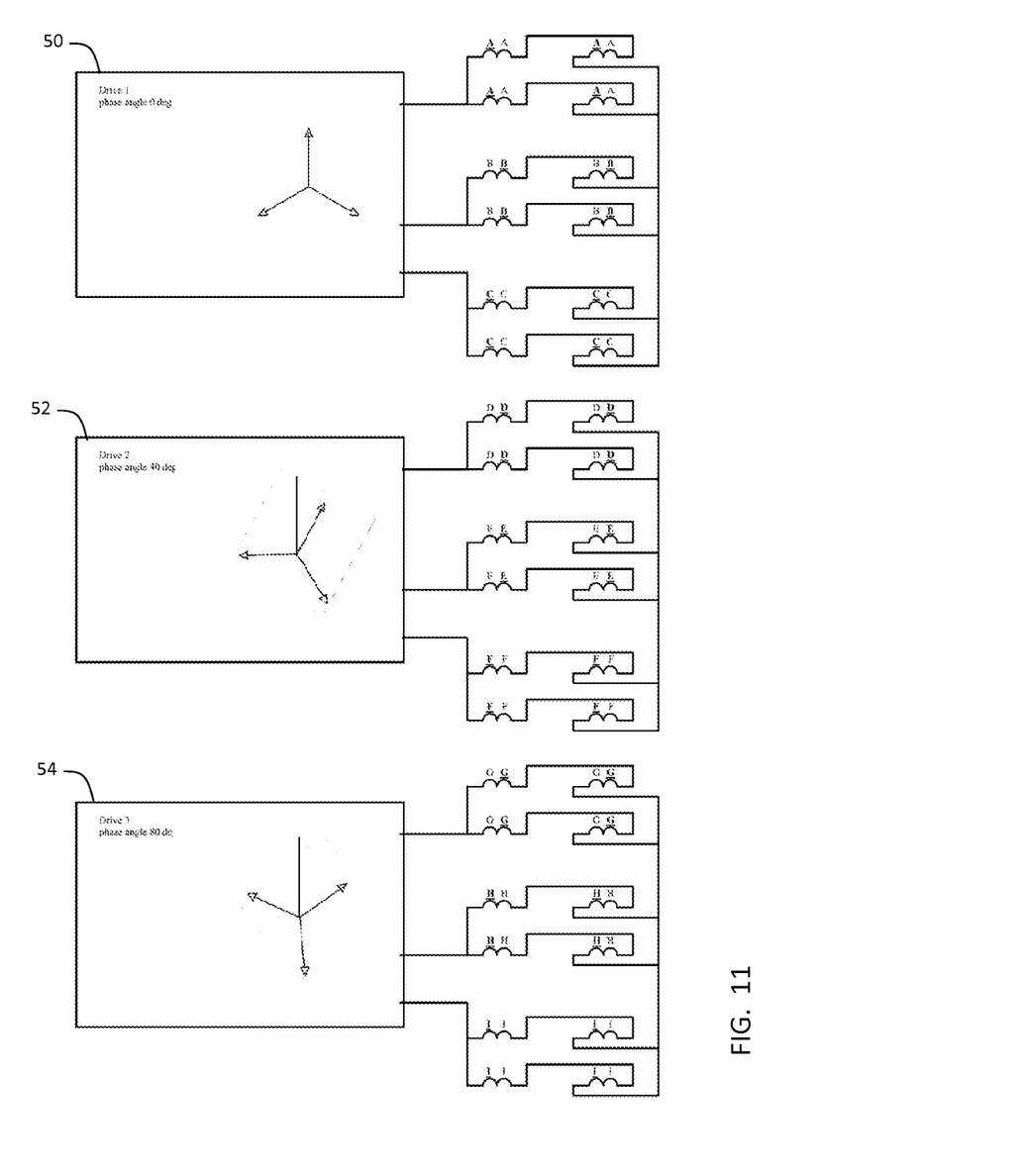

FIG. 11 depicts an exemplary embodiment of a 72 tooth permanent magnetic synchronous motor supplied from a real 9 phase supply system composed of three galvanic separated three phase drives. Drives 50, 52 and 54 are similar to those in FIG. 10. In the embodiment of FIG. 11, windings for a respective phase are connected in two parallel branches, each branch having series connected windings. The windings arranged in series alternate polarity.

Figure 12:
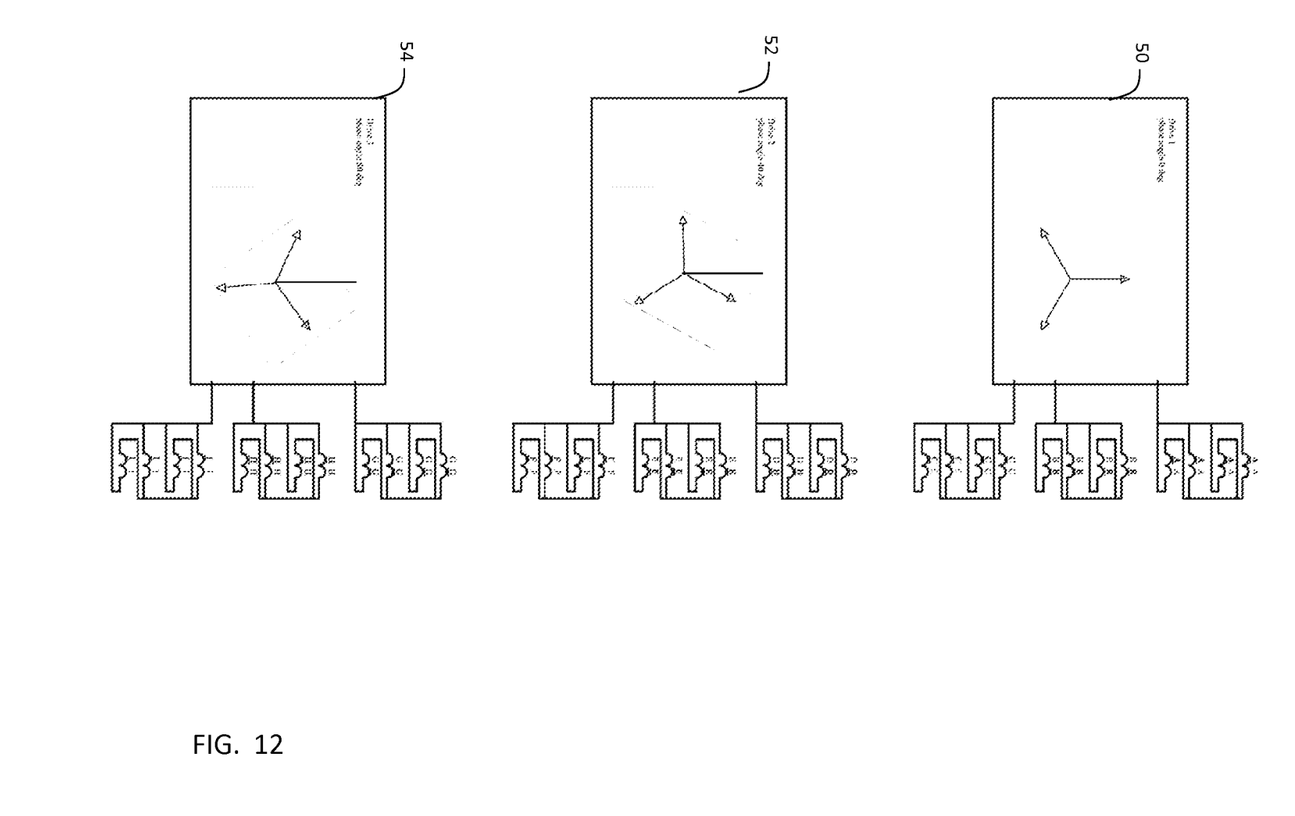

FIG. 12 depicts an exemplary embodiment of a 72 tooth permanent magnetic synchronous motor supplied from a real 9 phase supply system composed of 3 galvanic separated 3 phase drives. Drives 50, 52 and 54 are similar to those in FIG. 10. In the embodiment of FIG. 12, windings for a respective phase are connected in four parallel branches, each branch having a single positive-negative winding pair.

Figure 13:
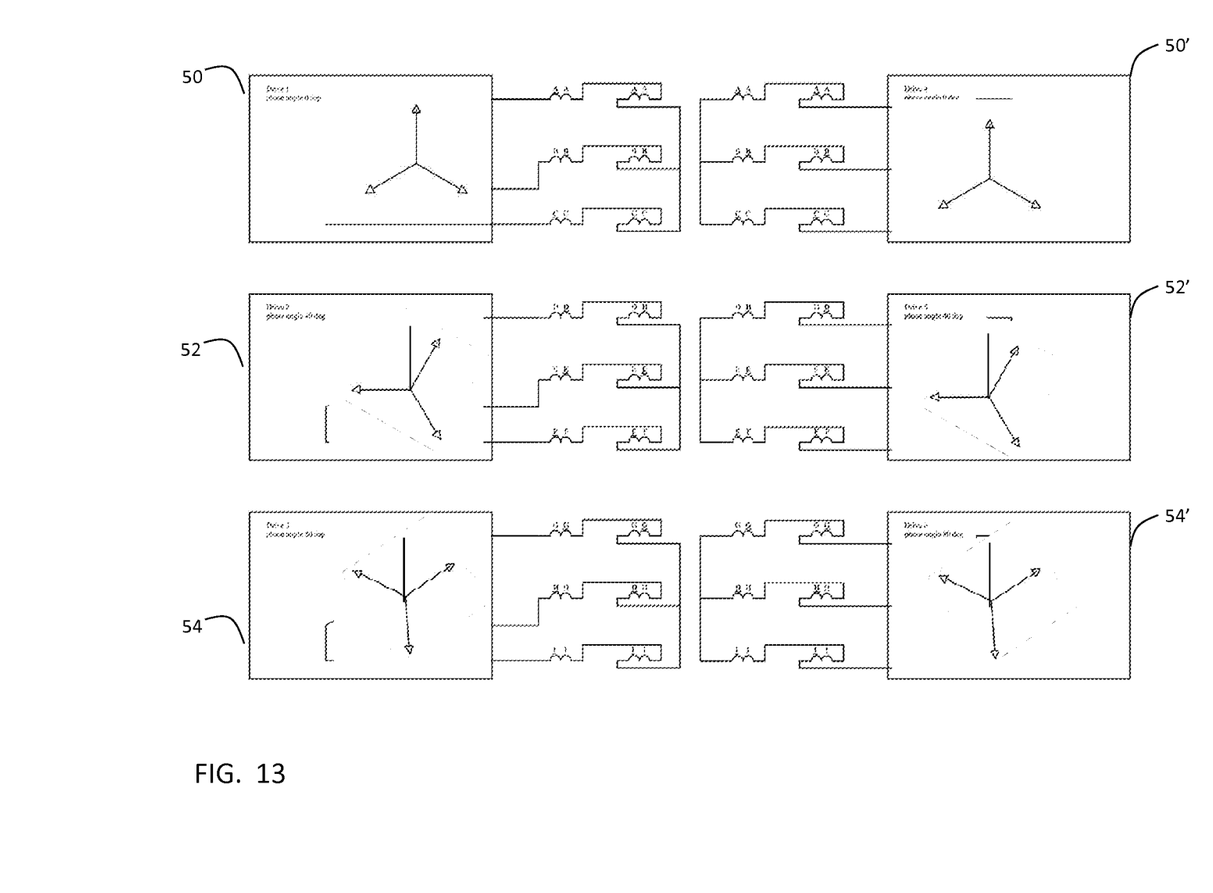
FIGS. 13-14 depict windings of a 9 phase permanent magnet synchronous motor coupled to 6 drives in exemplary embodiments.

FIG. 13 depicts an exemplary embodiment of a 72 tooth permanent magnetic synchronous motor supplied from a real 9 phase supply system composed of 6 galvanic separated 3 phase drives. In the embodiment of FIG. 13, two drives 50 and 50' are used to generate drive signals for phases ABC. Two drives 52 and 52' are used to generate drive signals for phases DEF. Two drives 54 and 54' are used to generate drive signals for phases GHI. Windings of the same phase coupled to a common drive are connected in series. Using two drives 50 and 50' for phases ABC, two drives 52 and 52' for phases DEF and two drives 54 and 54' for phases GHI provides improved power over the embodiments of FIGS. 10-12, to handle higher loads. Already existing drives are used to drive portions of the windings for a phase, eliminating the need to develop and certify drives with higher power.

Figure 14:
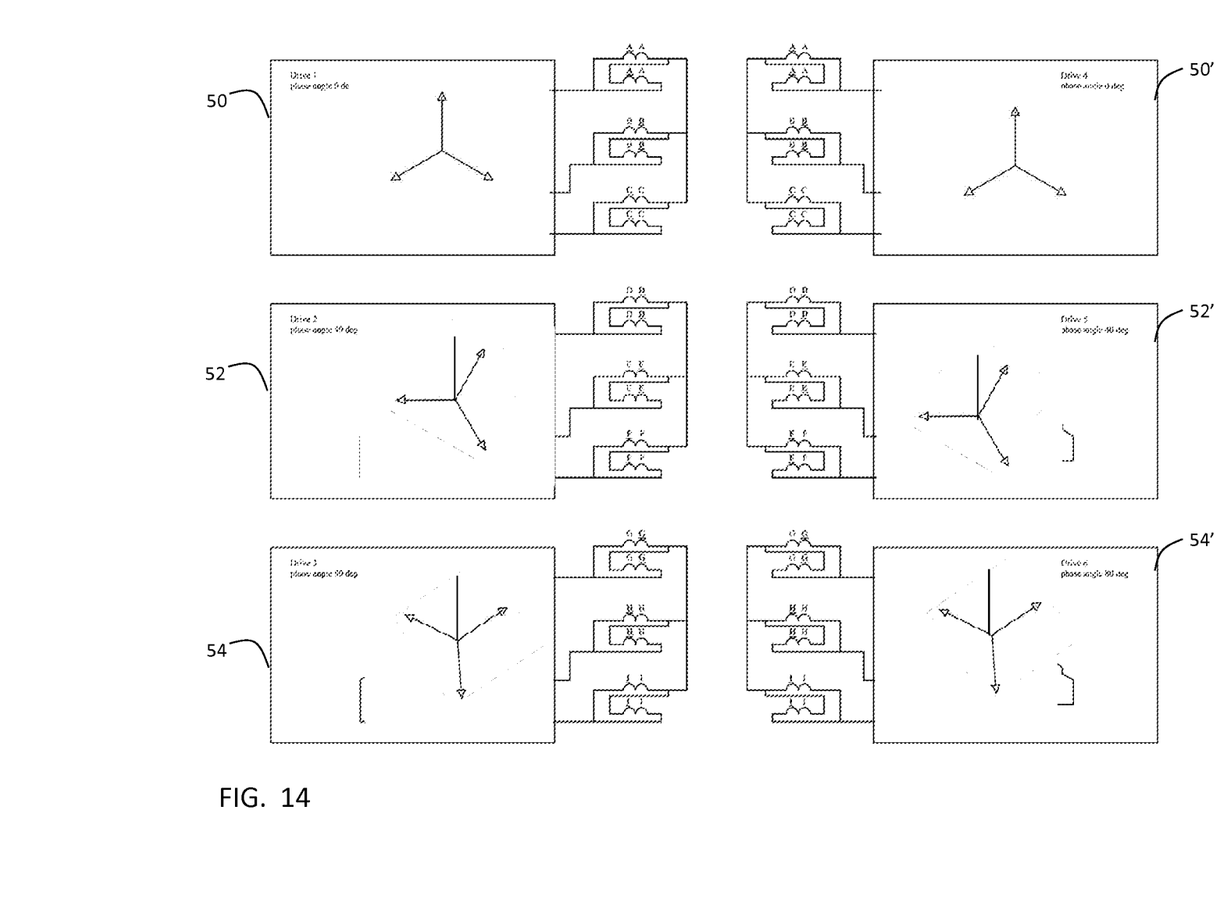

FIG. 14 depicts an exemplary embodiment of a 72 tooth permanent magnetic synchronous motor supplied from a real 9 phase supply system composed of 6 galvanic separated 3 phase drives. In the embodiment of FIG. 14, two drives 50 and 50' are used to generate drive signals for phases ABC. Two drives 52 and 52' are used to generate drive signals for phases DEF. Two drives 54 and 54' are used to generate drive signals for phases GHI. Windings of the same phase coupled to a common drive are connected in parallel.

The above embodiments of FIGS. 10-14 relate to a 9 phase permanent magnetic synchronous motor coupled to a number of drives. The number of drives in FIGS. 10-14 is 3 or 6, but in other embodiments the number of drives may be an integer multiple of 3.

Embodiments reduce cost for machines with higher load requirements. Using a plurality of drives rather than a single high power drive avoids costs of high power drive development. Using multiple drives provides redundancy. In case of one drive fails, the machine can still operate in a service mode with lower performance. Embodiments provide lower torque ripple which reduces noise and vibration levels. Embodiments provide lower content of magnetomotive force at higher harmonics, with a reduction of core losses and solid losses in the rotor of the machine.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as being limited by the foregoing description, but is only limited by the scope of the appended claims.

The invention claimed is:

1. A conveyance system comprising:
   a car;
   a machine for imparting motion to the car, the machine including a stator and a rotor, the stator including 12*k stator teeth, the rotor including 11*k rotor poles, wherein k is a natural even number, the machine including windings located at the stator teeth, the windings arranged in 6 phases; and
   a drive unit for providing drive signals to the machine, the drive unit including a plurality of drives, the number of drives being an integer multiple of 2;
   wherein the drives include a first drive and a second drive, the first drive generating drive signals of a first phase and the second drive generating drive signals of a second phase.

2. The conveyance system of claim 1 wherein: the windings associated with each phase and coupled to a common drive are arranged in electrical series.

3. The conveyance system of claim 1 wherein: the windings associated with each phase and coupled to a common drive are arranged in electrically parallel branches, each branch include windings arranged in electrical series.

4. The conveyance system of claim 1 wherein: the windings associated with each phase and coupled to a common drive are arranged in electrical parallel.

5. The conveyance system of claim 1 wherein: the number of drives equals 2.

6. The conveyance system of claim 1 wherein: the number of drives equals 4.

7. The conveyance system of claim 1 wherein: the car is an elevator car.

8. A conveyance system comprising:
   a car;
   a machine for imparting motion to the car, the machine including a stator and a rotor, the stator including 12*k stator teeth, the rotor including 11*k rotor poles, wherein k is a natural even number, the machine including windings located at the stator teeth, the windings arranged in 6 phases; and
   a drive unit for providing drive signals to the machine, the drive unit including a plurality of drives, the number of drives being an integer multiple of 2;
   wherein the drives include a first drive and a second drive, the first drive generating drive signals of a first phase, second phase and third phase, the second drive generating drive signals of a fourth phase, fifth phase and sixth phase.

9. The conveyance system of claim 8 wherein: the first phase and fourth phase are offset by an angle of 30 degrees.

10. A conveyance system comprising:
a car;
a machine for imparting motion to the car, the machine including a stator and a rotor, the stator including 18*k stator teeth, the rotor including 17*k rotor poles, wherein k is a natural even number, the machine including windings located at the stator teeth, the windings arranged in 9 phases; and
a drive unit for providing drive signals to the machine, the drive unit including a plurality of drives, the number of drives being an integer multiple of 3;
wherein the drives include a first drive and a second drive, the first drive generating drive signals of a first phase and the second drive generating drive signals of a second phase.

11. The conveyance system of claim 10 wherein: the windings associated with each phase and coupled to a common drive are arranged in electrical series.

12. The conveyance system of claim 10 wherein: the windings associated with each phase and coupled to a common drive are arranged in electrically parallel branches, each branch include windings arranged in electrical series.

13. The conveyance system of claim 10 wherein: the windings associated with each phase and coupled to a common drive are arranged in electrical parallel.

14. The conveyance system of claim 10 wherein: the number of drives equals 3.

15. The conveyance system of claim 10 wherein: the number of drives equals 6.

16. The conveyance system of claim 10 wherein: the car is an elevator car.

17. A conveyance system comprising:
a car;
a machine for imparting motion to the car, the machine including a stator and a rotor, the stator including 18*k stator teeth, the rotor including 17*k rotor poles, wherein k is a natural even number, the machine including windings located at the stator teeth, the windings arranged in 9 phases; and
a drive unit for providing drive signals to the machine, the drive unit including a plurality of drives, the number of drives being an integer multiple of 3;
wherein the drives include a first drive and a second drive, the first drive generating drive signals of a first phase, second phase and third phase, the second drive generating drive signals of a fourth phase, fifth phase and sixth phase.

18. The conveyance system of claim 17 wherein: the first phase and fourth phase are offset by an angle of 40 degrees.

19. The conveyance system of claim 17 wherein: the drives include a third drive, the third drive generating drive signals of a seventh phase, eighth phase and ninth phase.

20. The conveyance system of claim 19 wherein: the first phase and seventh phase are offset by an angle of 80 degrees.

* * * * *